United States Patent [19]

(12) United States Patent
Schmitt et al.

(10) Patent No.: US 11,345,212 B2
(45) Date of Patent: May 31, 2022

(54) AIR CONDITIONING DEVICE FOR A MOTOR VEHICLE AND METHOD FOR ITS OPERATION

(71) Applicant: Volkswagen Aktiengesellschaft, Wolfsburg (DE)

(72) Inventors: Stefan Schmitt, Velpke (DE); Gregor Homann, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 464 days.

(21) Appl. No.: 16/322,704

(22) PCT Filed: Jul. 26, 2017

(86) PCT No.: PCT/EP2017/068945
§ 371 (c)(1),
(2) Date: Feb. 1, 2019

(87) PCT Pub. No.: WO2018/024584
PCT Pub. Date: Feb. 8, 2018

(65) Prior Publication Data
US 2021/0300151 A1  Sep. 30, 2021

(30) Foreign Application Priority Data

Aug. 1, 2016 (DE) ..................... 10 2016 214 119.8

(51) Int. Cl.
*F25B 7/00* (2006.01)
*B60H 1/00* (2006.01)

(52) U.S. Cl.
CPC ..... *B60H 1/00921* (2013.01); *B60H 1/00278* (2013.01); *B60H 1/00485* (2013.01);
(Continued)

(58) Field of Classification Search
CPC ............ B60H 1/00921; B60H 1/00278; B60H 1/00485; B60H 2001/00928; B60H 2001/00949
(Continued)

(56) References Cited

U.S. PATENT DOCUMENTS 10,093,146 B2 * 10/2018 Furll ................ B60H 1/00007
2003/0094261 A1   5/2003 Abouchaar
(Continued)

FOREIGN PATENT DOCUMENTS

CN       1466651      1/2004
CN     102563943      7/2012
(Continued)

OTHER PUBLICATIONS

International Search Report of PCT Application No. PCT/EP2017/068944, dated Nov. 8, 2017.
(Continued)

*Primary Examiner* — Davis D Hwu
(74) *Attorney, Agent, or Firm* — Pearl Cohen Zedek Latzer Baratz LLP

(57) ABSTRACT

The invention relates to an air-conditioning device for a motor vehicle, comprising a refrigerant circuit (100) including a compressor (34), an indoor heat-exchanger (WÜ) arrangement connected to the outlet of the compressor and comprising a first and a second air/refrigerant-heat exchanger segment (21, 22), a first expansion valve (Exp. valve) (41) arranged therebetween, a second expansion valve (42), and a coupling heat exchanger (23) thermally connected to a heat source or sink, the outlet of which is connected to the inlet of the compressor (34), where the first and the second refrigerant line sections (I/II) are interconnected by means of a fourth refrigerant line section (IV), the inlet of the second air/refrigerant-heat exchanger segment
(Continued)

(22) and the outlet of the coupling heat exchanger are interconnected by means of a fifth refrigerant line section (V) which contains a third expansion valve (43), and the outlet of the first air/refrigerant-heat exchanger segment (21) and the inlet of the compressor (34) are interconnected by means of a sixth refrigerant line section (VI).

9 Claims, 4 Drawing Sheets

(52) U.S. Cl.
CPC ............ *B60H 2001/00928* (2013.01); *B60H 2001/00949* (2013.01)

(58) Field of Classification Search
USPC .......................................................... 62/79
See application file for complete search history.

(56) References Cited

U.S. PATENT DOCUMENTS

| | | | |
|---|---|---|---|
| 2004/0123976 A1 | 7/2004 | Horn et al. | |
| 2011/0139397 A1 | 6/2011 | Haussmann | |
| 2011/0303401 A1 | 12/2011 | Kamoshida et al. | |
| 2012/0085114 A1 | 4/2012 | Graaf et al. | |
| 2012/0122000 A1 | 5/2012 | Lee et al. | |
| 2013/0025311 A1 | 1/2013 | Graaf et al. | |
| 2013/0152611 A1 | 6/2013 | Matthias et al. | |
| 2013/0305753 A1 | 11/2013 | Graaf et al. | |
| 2014/0041826 A1* | 2/2014 | Takeuchi ........... B60H 1/00899 165/10 |
| 2015/0217625 A1 | 8/2015 | Kang et al. | |
| 2015/0283978 A1 | 10/2015 | Miyakoshi et al. | |
| 2015/0295285 A1 | 10/2015 | Takeuci et al. | |
| 2015/0380785 A1 | 12/2015 | Takeuchi et al. | |
| 2016/0052365 A1 | 2/2016 | Kohigashi et al. | |

FOREIGN PATENT DOCUMENTS

| | | |
|---|---|---|
| CN | 102679477 | 9/2012 |
| CN | 103032982 | 4/2013 |
| CN | 103189223 | 7/2013 |
| CN | 103373197 | 10/2013 |
| CN | 103568777 | 2/2014 |
| CN | 103660850 | 3/2014 |
| CN | 103660851 | 3/2014 |
| CN | 103702848 | 4/2014 |
| CN | 103868268 | 6/2014 |
| CN | 103906636 | 7/2014 |
| CN | 104245376 | 12/2014 |
| CN | 105073461 | 11/2015 |
| CN | 105082935 | 11/2015 |
| CN | 204880701 | 12/2015 |
| CN | 205273101 | 6/2016 |
| DE | 10 2009 043 316 A1 | 3/2011 |
| DE | 10 2010 042 127 A1 | 4/2012 |
| DE | 10 2012 100 525 A1 | 1/2013 |
| DE | 10 2011 056869 | 6/2013 |
| DE | 10 2012 111 672 B4 | 10/2013 |
| DE | 10 2013 206 630 A1 | 10/2014 |
| DE | 10 2013 004 682 T5 | 1/2015 |
| DE | 11 2013 005 304 T5 | 7/2015 |
| DE | 11 2013 005 367 T5 | 7/2015 |
| DE | 10 2014 102078 | 8/2015 |
| DE | 11 2014 002805 | 3/2016 |
| DE | 11 2015 003005 | 3/2017 |
| EP | 0402131 | 12/1990 |
| EP | 1621377 | 2/2006 |
| JP | 10-044758 | 2/1998 |
| JP | H11139154 | 5/1999 |
| JP | 2000146329 | 5/2000 |
| JP | 2003-291635 | 10/2003 |
| JP | 2004-42759 | 2/2004 |
| JP | 2012-81955 | 4/2012 |
| JP | 2013032045 | 2/2013 |
| JP | 2013 216246 A | 10/2013 |
| JP | 2013-230809 | 11/2013 |
| KR | 100927811 | 11/2009 |
| KR | 20090117055 | 11/2009 |
| KR | 20120021142 | 3/2012 |
| KR | 20140033223 | 3/2014 |
| KR | 20150098167 | 8/2015 |
| KR | 101558823 | 10/2015 |
| WO | WO/0229212 | 4/2002 |
| WO | WO/03064193 | 8/2003 |
| WO | WO 2012/028307 A1 | 3/2012 |

OTHER PUBLICATIONS

Office Action for Chinese Patent Application No. 20178048346, dated Jul. 21, 2021.
Decision on Grant of Patent for Korean Patent Application No. 20197005934, dated May 26, 2020.
Supplemental Search Report for Chinese Patent Application No. 20178048346, dated Dec. 14, 2021.
Notice of Allowance for Japanese Appl. No. 2019-505168 dated Jan. 20, 2020.

\* cited by examiner

AIR CONDITIONING DEVICE FOR A MOTOR VEHICLE AND METHOD FOR ITS OPERATION

CROSS-REFERENCE TO RELATED APPLICATIONS

This application is a National Phase Application of PCT International Application No. PCT/EP2017/068945, International Filing Date Jul. 26, 2017, claiming priority of German Patent Application No. 10 2016 214 119.8, filed Aug. 1, 2016, which is hereby incorporated by reference.

FIELD OF THE INVENTION

The invention relates to an air conditioning device for a motor vehicle, having, situated in a housing, a refrigerant circuit that includes
 a compressor,
 an internal heat exchanger arrangement which on the inlet side is connected to the outlet of the compressor via a first refrigerant line section, and through which portions of an air stream are conductible into a passenger compartment of the motor vehicle, including
  a first air/refrigerant heat exchanger segment that is operable as an evaporator of the refrigerant circuit,
  a first expansion valve that is situated upstream from the first air/refrigerant heat exchanger segment in the flow direction of the refrigerant, and
  a second air/refrigerant heat exchanger segment that is situated upstream from the first expansion valve in the flow direction of the refrigerant, and that is operable as a condenser of the refrigerant circuit,
 a second expansion valve situated downstream from the internal heat exchanger arrangement in the flow direction of the refrigerant, and
 a coupling heat exchanger that is connected on the input side to the second expansion valve via a second refrigerant line section, and thermally connected to a heat source or heat sink, and whose outlet is connected to the inlet of the compressor via a third refrigerant line section.

BACKGROUND OF THE INVENTION

The invention further relates to two different methods for operating this type of air conditioning device.

Such an air conditioning device and a method for its operation are known from WO 2012/028307 A1.

This publication discloses an air conditioning device for a motor vehicle, having a refrigerant circuit that is operable both in a heat pump mode and in a cooling mode. As is common in refrigerant circuits, it includes a compressor for compressing the refrigerant. Situated downstream from the compressor on the refrigerant side is an internal heat exchanger arrangement with two air/refrigerant heat exchanger segments, the heat exchanger segment on the refrigerant input side always being operated as a condenser in all operating modes, and the heat exchanger segment on the refrigerant output side being operable either as a condenser or as an evaporator as necessary. The term "condenser" is to be understood in a broad sense here, and also includes devices that act as a gas cooler in refrigerant circuits containing noncondensable refrigerants. An air stream which may be conducted via distributor channels into the interior of the motor vehicle may flow through internal heat exchanger segments. A first expansion valve, with which a pressure difference is settable between the two heat exchanger segments, is situated between the two heat exchanger segments of the internal heat exchanger arrangement. In addition, the known refrigerant circuit includes an external heat exchanger that is designed as an air/refrigerant heat exchanger and that thermally couples the cooling circuit to the outside air. A second expansion valve, situated on the side of the heat exchanger segment, downstream from the refrigerant flow, opposite from the first expansion valve is also provided.

In heat pump mode, the compressed refrigerant initially flows through the heat exchanger segment that is always operated as a condenser, where it releases heat to the air stream flowing through it. The cooled refrigerant subsequently flows through the first expansion valve, it being possible to set a pressure drop if the downstream heat exchanger segment is to be operated at a lower temperature level. However, this heat exchanger segment is also utilized as an additional condenser which releases heat to the air stream flowing through it, which thus undergoes heating twice while passing through the internal heat exchanger arrangement. Significant expansion of the refrigerant subsequently takes place by means of the second expansion valve, so that the external heat exchanger may be operated as an evaporator and may absorb heat from the ambient air flowing through it. The refrigerant subsequently returns back to the compressor.

In cooling mode, the compressed refrigerant likewise initially flows through the heat exchanger segment that is always operated as a condenser, where it releases heat to the air stream flowing through it. However, since it is conducted into the passenger compartment, and specifically in cooling mode no significant heating is desired, a substantial portion of the air stream may be diverted around this heat exchanger segment by means of a bypass flap. However, the gas cooling or condensation in this segment is therefore extremely inefficient. In cooling mode the first expansion valve is closed, so that the refrigerant flows from the outlet of the stated heat exchanger segment directly to the external heat exchanger, which in this mode acts as the actual condenser and releases heat to the outside air flowing through it. It is noted that in cooling mode, the refrigerant flows through the external heat exchanger in the opposite direction compared to the heat pump mode described above. Downstream from the external heat exchanger, the refrigerant flows through the second expansion valve to the other internal heat exchanger segment, which is operated as an evaporator in cooling mode. The expansion of the refrigerant that is necessary for this purpose takes place in the second expansion valve. From the evaporator, the refrigerant then returns back to the compressor.

A disadvantage of the known air conditioning device is its low efficiency in cooling mode.

SUMMARY OF THE INVENTION

The object of the present invention is to improve a generic air conditioning device in such a way that it may be operated more efficiently, in particular in cooling mode.

This object is achieved, in conjunction with the features of the preamble of claim 1, in that
 the first and the second refrigerant line section are connected to one another via a fourth refrigerant line section,
 the inlet of the second air/refrigerant heat exchanger segment and the outlet of the coupling heat exchanger are connected to one another via a fifth refrigerant line section that contains a third expansion valve, and the outlet of the first air/refrigerant heat exchanger segment and the inlet of the compressor are connected to one another via a sixth refrigerant line section, wherein adjustable valves are distributed in the refrigerant circuit in such a way that, as a function of their switching position, either in a heat pump mode, refrigerant may flow through the first, second, and third refrigerant line sections, while flow of refrigerant through the fourth, fifth, and sixth refrigerant line sections is prevented, or in a cooling mode, refrigerant may flow through the fourth, fifth, and sixth refrigerant line sections, while flow of refrigerant through the first, second, and third refrigerant line sections is prevented.

Preferred embodiments of the invention are the subject matter of the dependent patent claims.

The inventors have found that the efficiency losses in cooling mode may be attributed in particular to the permanent assignment of the condenser function to the internal heat exchanger segment on the refrigerant input side, which is referred to here as the second air/refrigerant heat exchanger segment. For this reason, with the first fourth refrigerant line section the inventors have created a direct connection, which bypasses the second air/refrigerant heat exchanger segment, between the inlet of the first refrigerant line section and the outlet of the second refrigerant line section. In addition, valves have been provided by means of which the refrigerant that is compressed by the compressor may be conducted either via the first refrigerant line section (in heat pump mode) or via the fourth refrigerant line section (in cooling mode).

In cooling mode, the compressed refrigerant thus initially flows through the coupling heat exchanger, which acts as a condenser and thermally couples the refrigerant circuit to a heat sink. In the case of the design of the coupling heat exchanger as an external heat exchanger, this may be the outside air. In the case of the design of the coupling heat exchanger as a refrigerant/refrigerant heat exchanger, this may be a thermally coupled refrigerant circuit, such as an engine cooling circuit or electronics system cooling circuit. Downstream from the coupling heat exchanger, the refrigerant passes through the fifth refrigerant line section, and within same passes through a third expansion valve provided according to the invention, in which it undergoes expansion. Only downstream from the third expansion valve does the cooled and expanded refrigerant flow into the second air/refrigerant heat exchanger segment of the internal heat exchanger arrangement, which may thus be operated as an evaporator Due to the invention, both internal heat exchanger segments may be operated as evaporators, so that it is possible to exclusively cool in the internal heat exchanger arrangement, and to dispense with the heating effect of the segment used there as a condenser, which reduces the efficiency and is avoidable in the prior art. However, it is also possible to operate the second air/refrigerant heat exchanger segment with heating, even in cooling mode. This requires only a reduction in the pressure drop in the third expansion valve. In the extreme case, it is even possible to dispense with pressure reduction in the third expansion valve and to operate the second internal heat exchanger segment at maximum temperature, while the first expansion valve is used to achieve the pressure drop in order to operate the first internal heat exchanger segment as the (sole) evaporator. In addition to the increase in efficiency in cooling mode, the invention thus also allows higher flexibility in controlling the refrigerant circuit.

In heat pump mode, the air conditioning device according to the invention operates similarly to the category-defining device described at the outset. The compressed refrigerant hereby flows across the first refrigerant line section and directly into the second internal heat exchanger segment, which acts as a condenser. The downstream first internal heat exchanger segment, depending on the setting of the first expansion valve, either likewise operates as a condenser or operates as an evaporator, wherein desired temperature differences between the two segments are settable with great flexibility. The refrigerant then flows through the second expansion valve, where in any case it is expanded to the extent that the subsequent coupling heat exchanger in any case acts as an evaporator in order to absorb heat from the thermally coupled heat source.

This results in two particularly preferred methods for operating an air conditioning device according to the invention. The first is a method according to claim 8, namely, a method for operating an air conditioning device according to the invention, wherein the adjustable valves are switched in the switching position of the heat pump mode, the first expansion valve is controlled for setting a temperature difference between the second air/refrigerant heat exchanger segment, operated as a condenser, and the first air/refrigerant heat exchanger segment, operated as a condenser or as an evaporator, and the second expansion valve is controlled for setting a pressure difference between the first air/refrigerant heat exchanger segment and the coupling heat exchanger, operated as an evaporator.

The second is a method according to Claim 9, a method for operating an air conditioning device according to the invention, wherein the adjustable valves are switched in the switching position of the cooling mode, the third expansion valve is controlled for setting a pressure difference between the coupling heat exchanger, operated as a condenser, and the second air/refrigerant heat exchanger segment, operated as an evaporator or as a condenser, and the first expansion valve is controlled for setting a temperature difference between the second air/refrigerant heat exchanger segment and the first air/refrigerant heat exchanger segment, operated as an evaporator.

As explained, it is an essential element of the invention that the refrigerant alternatively flows either through the first or through the fourth refrigerant line section, depending on the intended mode. In particular two variants are particularly advantageous in achieve this. In a first variant, it is provided that a switchable two-way valve is situated at the branch point from the first and fourth refrigerant line sections. In contrast, in a second variant it is provided that a switchable shutoff valve is situated in each case downstream from the branch point of the first and fourth refrigerant line sections. In the first case, the design and control of the two-way valve are complex, whereas the saving of a component may be regarded as advantageous. In the second case, although the number of components increases, their design and control are particularly simple, which is the advantage of this variant.

Another important feature of the invention is that the refrigerant alternatively flows through the third or the sixth refrigerant line section, depending on the desired operating mode. Once again, two variants are regarded as particularly advantageous in achieving this switching capability. In a first variant, it is provided that a switchable two-way valve is situated at the opening point of the third and sixth refrigerant line sections. In contrast, in a second variant it is provided that a switchable shutoff valve is situated in each case upstream from the opening point of the third and sixth refrigerant line sections. Reference is analogously made to the above discussion with regard to the advantages and disadvantages of the two variants.

Depending on the selection of the refrigerant, it may be meaningful or even necessary to equip the refrigerant circuit with an additional internal heat exchanger, i.e., a refrigerant/refrigerant heat exchanger that thermally couples different sections of the refrigerant circuit to one another. In such an embodiment, it may thus be provided that the low pressure outlet of an internal heat exchanger, designed as a refrigerant/refrigerant heat exchanger, and whose low pressure inlet is situated downstream from the opening point of the third and sixth refrigerant line sections and whose high pressure inlet and outlet are situated between the outlet of the coupling heat exchanger and the branch point of the third and fifth refrigerant line sections, is situated upstream from the compressor. In other words, the internal heat exchanger on the low pressure side is situated directly upstream from the inlet of the compressor, and on the high pressure side is situated directly downstream from the outlet of the coupling heat exchanger.

BRIEF DESCRIPTION OF THE DRAWINGS

Further features and advantages of the invention result from the following detailed description and the drawings, which show the following.

DETAILED DESCRIPTION OF THE INVENTION

Figure 1A:
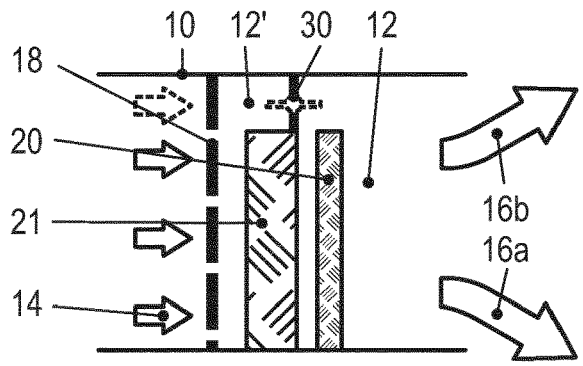
FIG. 1 shows a first embodiment of an internal heat exchanger arrangement.

Identical or analogous elements are denoted by the same reference numerals in the figures.

Figure 1B:
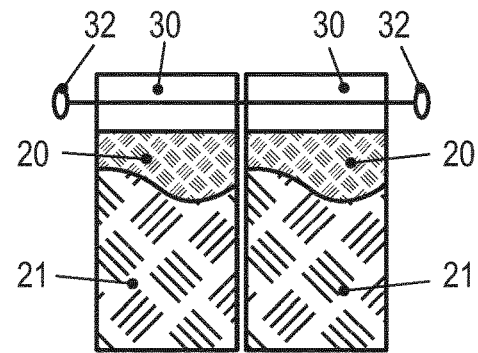
Figure 2A:
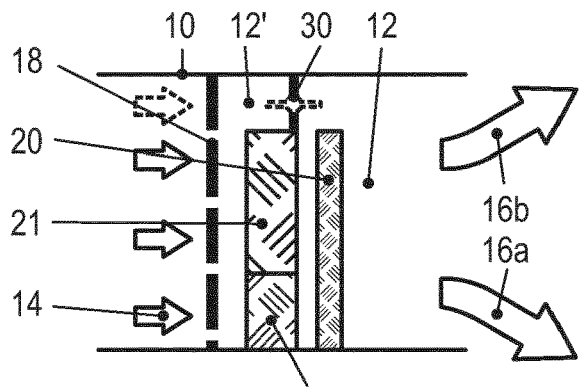
FIG. 2 shows a second embodiment of an internal heat exchanger arrangement.
Figure 2B:
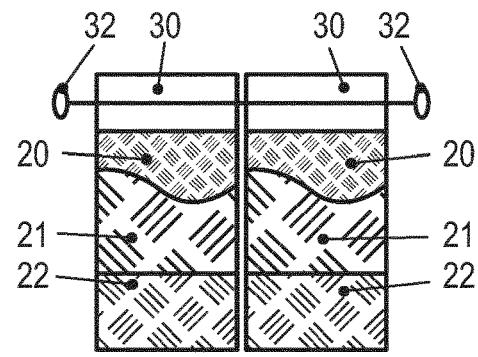
Figure 3A:
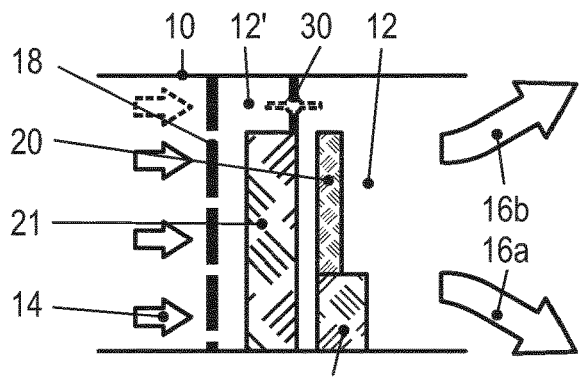
FIG. 3 shows a third embodiment of an internal heat exchanger arrangement.
Figure 3B:
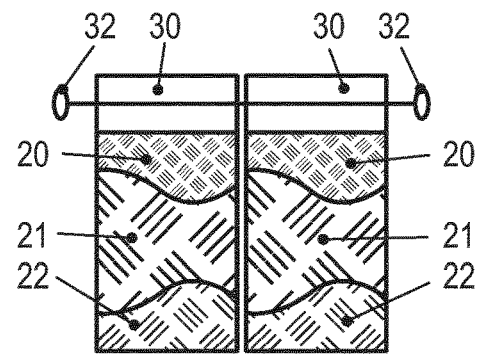
Figure 4A:
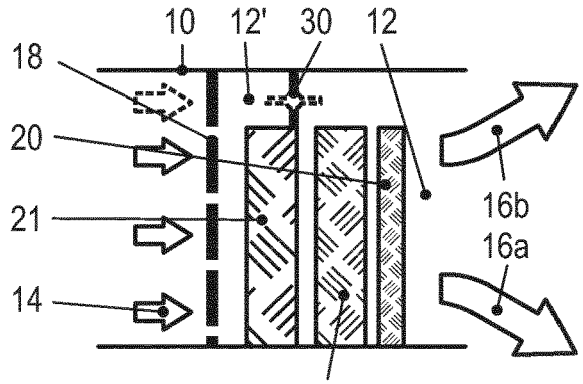
FIG. 4 shows a fourth embodiment of an internal heat exchanger arrangement.
Figure 4B:
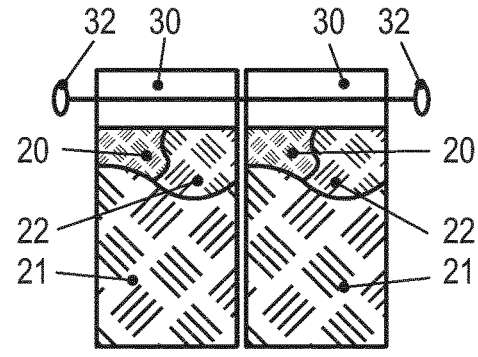

FIGS. 1 through 4 show different internal heat exchanger arrangements, of which those in FIGS. 2 through 4 may particularly advantageously find use in conjunction with the refrigerant circuit connection described below, as illustrated in FIGS. 5 through 9. Subfigures 1a through 4a each illustrate a vertical longitudinal section parallel to the air guiding channel extension. Subfigures 1b through 4b illustrate partially cutaway views of the heat exchanger, viewed in the direction of the air stream.

An air guiding channel 12 is formed in a housing 10, not illustrated in detail. An air stream 14 may flow through the air guiding channel 12, the air stream typically being generated by an upstream blower and led into a downstream mixing chamber, from where it is led across further vertical channels to vents in the passenger compartment. Strictly by way of example, FIGS. 1 through 4 illustrate substreams 16a that are directed into the floorboard of the passenger compartment, and substreams 16b that are directed into the headroom of the passenger compartment.

The embodiments in FIGS. 1 through 4 share the common feature of an optional filter 18 that spans the air guiding channel and keeps dust, pollen, and other contaminants from entering the downstream internal heat exchangers and the passenger compartment. The term "internal heat exchanger" is intended to mean that temperature-controlled air can flow in this element and into the interior of the passenger compartment. In addition, the embodiments in FIGS. 1 through 4 have an electric heat exchanger segment 20, made up of resistance heating elements, preferably so-called positive temperature coefficient (PTC) resistance elements. In all embodiments in FIGS. 1 through 4, a first air/refrigerant heat exchanger segment 21 is situated between the optional filter 18 and the electric heat exchanger segment 20, i.e., on the upstream air side of the electric heat exchanger segment 20. The embodiments in FIGS. 2 through 4 additionally show a second air/refrigerant heat exchanger segment 22 which, depending on the embodiment, together with the first air/refrigerant heat exchanger segment 21 forms a first heat exchanger (FIG. 2), together with the electric heat exchanger segment 20 forms a second heat exchanger (FIG. 3), or independently forms a third heat exchanger according to the claims (FIG. 4).

A bypass flap 30 that closes or opens the side path 12' of the air guiding channel 12 that bypasses the heat exchanger segments 20, 21, 22, depending on the switching position, is characteristic of all embodiments in FIGS. 1 through 4. The closed flap position is illustrated by solid lines in FIGS. 1 through 4. The open flap position is additionally illustrated by dashed lines in subfigures 1a through 4a. The entire air stream 14 is forced through the heat exchanger segments 20, 21, 22 in the closed flap position, so that heat transfer takes place between the refrigerant and the air, and between the resistance heating elements and the air. In contrast, in the open flap position the major portion of the air stream 14 will flow across the side path 12' due to the lower flow resistance, so that essentially no heat transfer takes place.

The differences in the embodiments in FIGS. 1 through 4 are discussed below.

FIG. 1 illustrates the simplest embodiment. The electric heat exchanger segment 20 and the first air/refrigerant heat exchanger segment 21 here occupy essentially the same region of the cross section of the air guiding channel 12. The electric heat exchanger segment 20 is situated downstream from the first air/refrigerant heat exchanger segment 21 in the air flow direction. The bypass flap 30 is situated in the upper area of the air guiding channel 12, so that its side path 12' extends in the upper edge area of the air guiding channel 12. For flap positions of the bypass flap 30 that allow a substantial flow portion through the heat exchanger segments 20, 21 as well as a substantial flow portion across the side path 12', this results in temperature stratification in the downstream mixing chamber. This may be utilized in particular to allow a warmer substream 16a to flow into the floorboard and a cooler substream 16b to flow into the headroom of the passenger compartment. As indicated in subfigure 1b, lateral segmentation of the heat exchanger segments 20, 21 is additionally provided, the individual lateral segments preferably being separately controllable. When the downstream mixing chamber has appropriate lateral branching, it is thus possible to control the temperature of the driver and front passenger compartment differently. The bypass flap 30 is preferably automatically controllable, for which purpose the actuators 32 indicated in subfigure 1b may be used.

In addition to the position of the bypass flap 30 and the lateral segmentation of the heat exchanger segments 20, 21, in particularly preferred embodiments it is possible for even finer differentiation of the temperature to take place. This is due in particular to the fact that in such embodiments, the electric heat exchanger segment 20 is made up of a plurality of independently controllable resistance heating elements.

In the embodiment in FIG. 2, a second air/refrigerant heat exchanger segment 22 is additionally provided that is situated vertically beneath the first air/refrigerant heat exchanger segment 21. In particular in the context of the refrigerant circuit connections to be described in greater detail below, it is possible to operate the second air/refrigerant heat exchanger segment 22 in heating mode and the first air/refrigerant heat exchanger segment 21 in cooling mode, resulting in improved temperature stratification in the downstream mixing chamber. On the other hand, it is also possible to operate the first and the second heat exchanger segment 21, 22 at the same temperature, or in particular to operate them together in the cooling or heating mode, but at different temperatures. The electric heat exchanger segment 20 may be used as an auxiliary heater or counterheater. Those skilled in the art recognize that an extremely flexible design of the temperature stratification in the mixing chamber is thus made possible. In other respects, analogous reference is made to the above discussion for FIG. 1.

In the embodiment from FIG. 3, the second air/refrigerant heat exchanger segment 22 is situated vertically beneath the electric heat exchanger segment 20 and downstream from the first air/refrigerant heat exchanger segment 21 in the air flow direction. Here as well, a very flexible design of the temperature stratification in the mixing chamber results, although the influence of the first air/refrigerant heat exchanger segments 21 increases at the expense of the influence of the electric heat exchanger segment 20. In other respects, analogous reference is made to the above discussion for FIG. 1.

Lastly, FIG. 4 illustrates a variant in which the electric heat exchanger segment 20, the first air/refrigerant heat exchanger segment 21, and the second air/refrigerant heat exchanger segment 22 all occupy essentially the same region of the air guiding channel cross section. Similarly as for the embodiment from FIG. 1, the temperature stratification in the mixing chamber here is essentially regulated by the bypass flap 30 and optionally also by small-scale controllability of the electric heat exchanger segment 20. However, greater flexibility in the temperature control is provided here due to the larger number of controllable heat exchanger segments 20, 21, 22.

Figure 5:
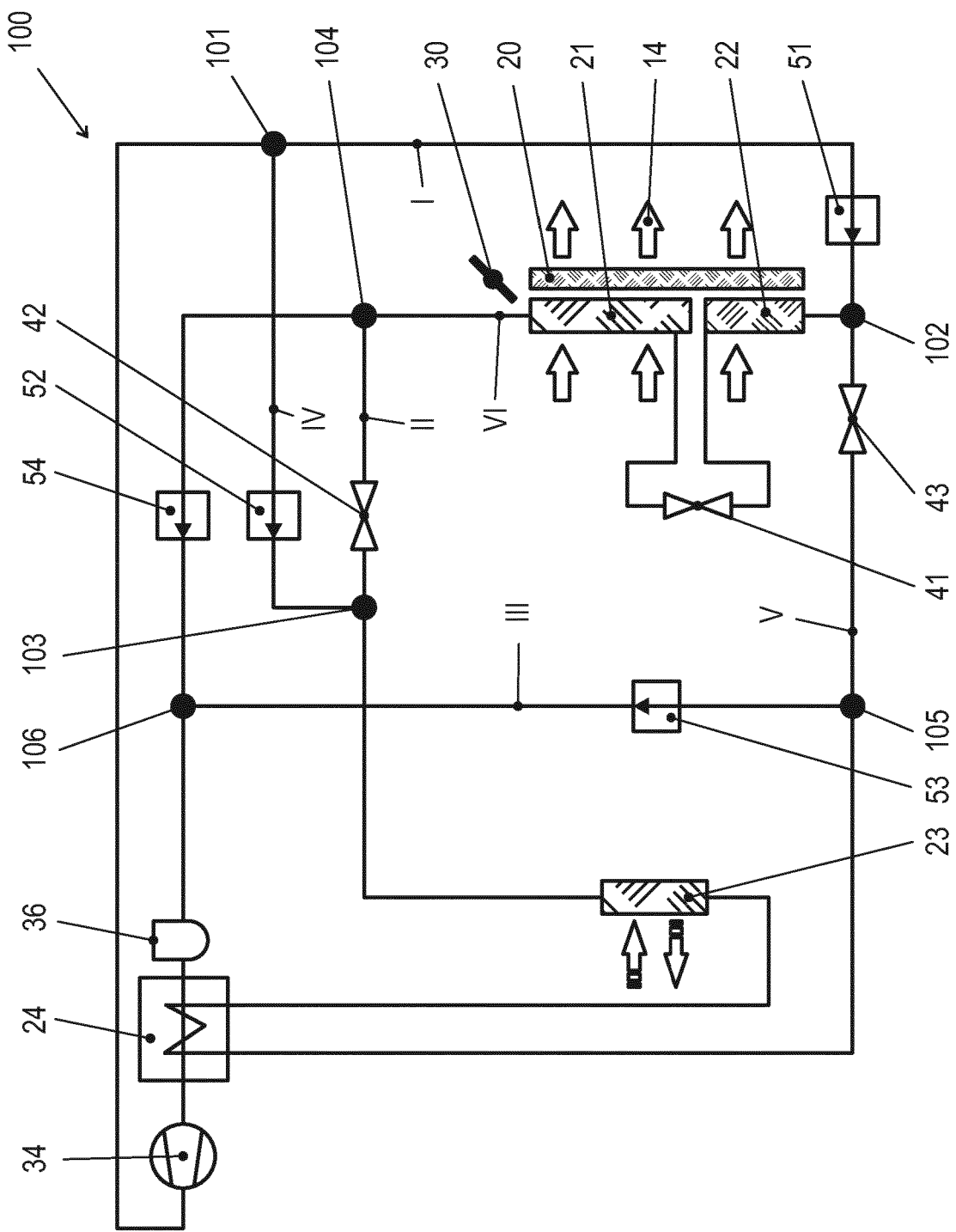
FIG. 5 shows a refrigerant circuit using an internal heat exchanger arrangement according to FIG. 2.
Figure 8:
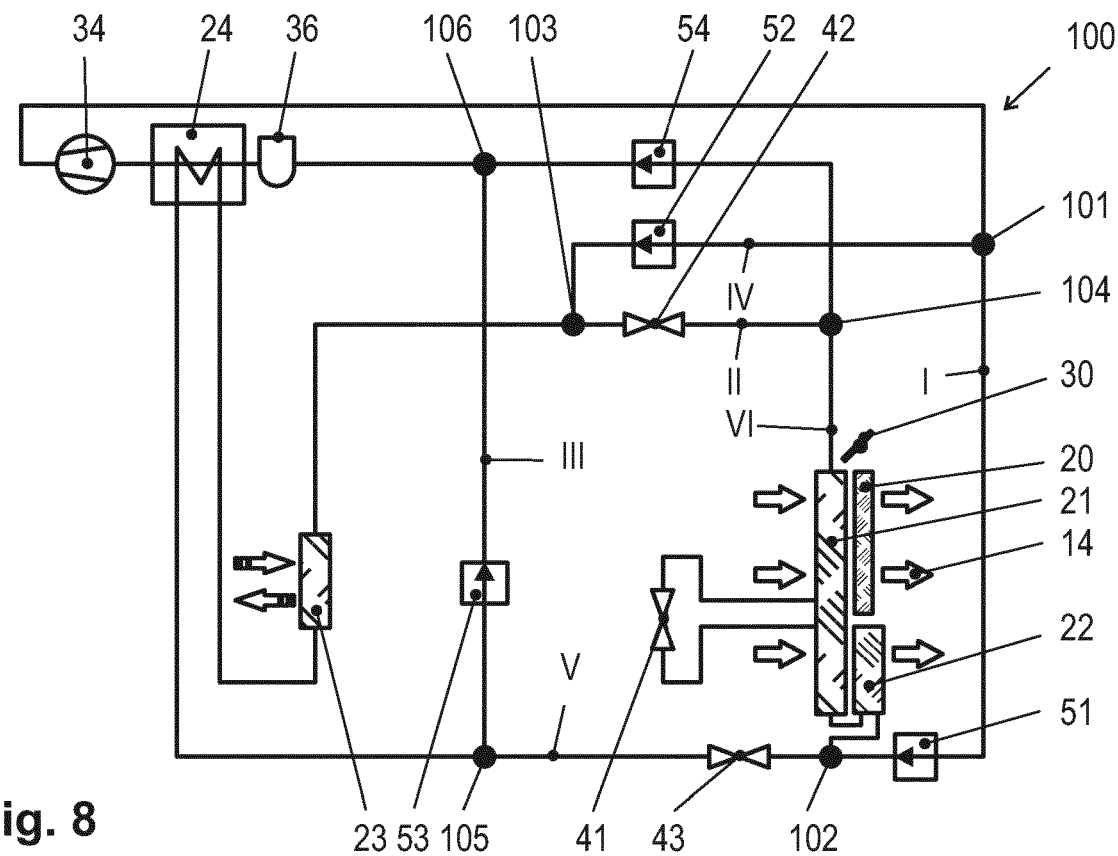
FIG. 8 shows a refrigerant circuit using an internal heat exchanger arrangement according to FIG. 3.
Figure 9:
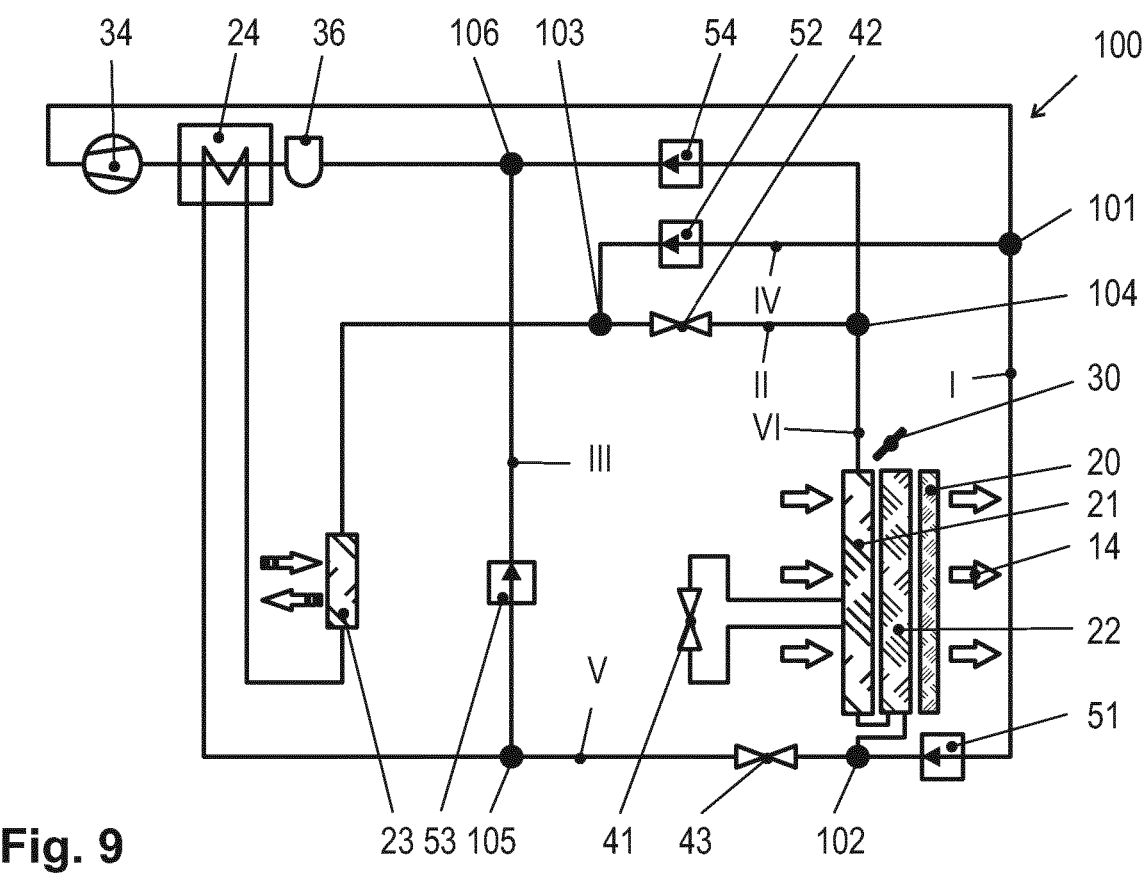
FIG. 9 shows a refrigerant circuit using an internal heat exchanger arrangement according to FIG. 4.

FIG. 5 shows a particularly advantageous circuit design of a refrigerant circuit 100, in which the internal heat exchanger arrangement from FIG. 2 is used (without the optional filter 18, which of course may also be used here). As illustrated in FIGS. 8 and 9, essentially the same circuitry may also be achieved by using the internal heat exchanger arrangement in FIGS. 3 and 4. The following discussion, which focuses on the refrigerant circuit 100 from FIG. 5, thus also applies in its entirety to the refrigerant circuits 100 in FIGS. 8 and 9, with consideration of the comments made with regard to FIGS. 3 and 4.

The refrigerant circuit 100 includes a compressor 34 via which refrigerant is compressible. The outlet of the compressor 34 is connected to a first branch point or opening point 101 via a refrigerant line. The terms "branch point" and "opening point" are used interchangeably here. Two refrigerant line sections diverge from the first branch point 101, namely, a first refrigerant line section I and a fourth refrigerant line section IV. The first refrigerant line section I contains a first shutoff valve 51 and ends at a second branch point or opening point 102. The fourth refrigerant line section IV contains a second shutoff valve 52 and ends at a third branch point or opening point 103. The second opening point 102 is connected to the inlet of the second air/refrigerant heat exchanger segment 22. The outlet of the second air/refrigerant heat exchanger segment 22 is connected to the inlet of the first air/refrigerant heat exchanger segment 21 via a first expansion valve 41. The outlet of the first air/refrigerant heat exchanger segment 21 is connected to a fourth branch point or opening point 104, which in turn is connected to the third opening point 103 via a second refrigerant line section II that contains a second expansion valve 42.

The second opening point 102 is additionally connected to a fifth branch point or opening point 105 via a fifth refrigerant line section V that contains a third expansion valve 43. The fifth branch point or opening point 105 is connected on the one hand to the high-pressure outlet of an internal heat exchanger 24 designed as a refrigerant/refrigerant heat exchanger, and on the other hand is connected via a third refrigerant line section III, containing a third shutoff valve 53, to a sixth branch point or opening point 106, which via a collector 36 is in turn connected to the low-pressure inlet of the internal heat exchanger 24, whose low-pressure outlet is connected to the inlet of the compressor 34.

The low-pressure inlet of the internal heat exchanger 24 is connected to the outlet of a coupling heat exchanger 23 which is designed as a refrigerant/refrigerant heat exchanger, and which on the refrigerant side is a component of a refrigerant circuit, not illustrated in greater detail, which may be used, for example, to cool a drive unit and/or its electronics system. A refrigerant circuit for cooling an internal combustion engine is conceivable. The refrigerant circuit may likewise be used to cool an electric drive unit and/or its electronics system, in particular the power electronics system and the traction batteries. Also conceivable is a design of the coupling heat exchanger as an external heat exchanger designed as an air/refrigerant heat exchanger. However, this is less energetically favorable.

At the input side the coupling heat exchanger 23 is connected to the third opening point 103.

Lastly, the fourth branch point 104 is connected to the sixth opening point 106 via a sixth refrigerant line section VI containing a fourth shutoff valve 54.

The preferred operating modes of the refrigerant circuit 100 from FIG. 5 are explained with reference to FIGS. 6 and 7. The respectively active sections of the refrigerant line, i.e., through which refrigerant flows, are illustrated by solid lines in FIGS. 6 and 7. The sections that are blocked in the particular mode, i.e., through which refrigerant does not flow, are shown in dashed lines.

Figure 6:
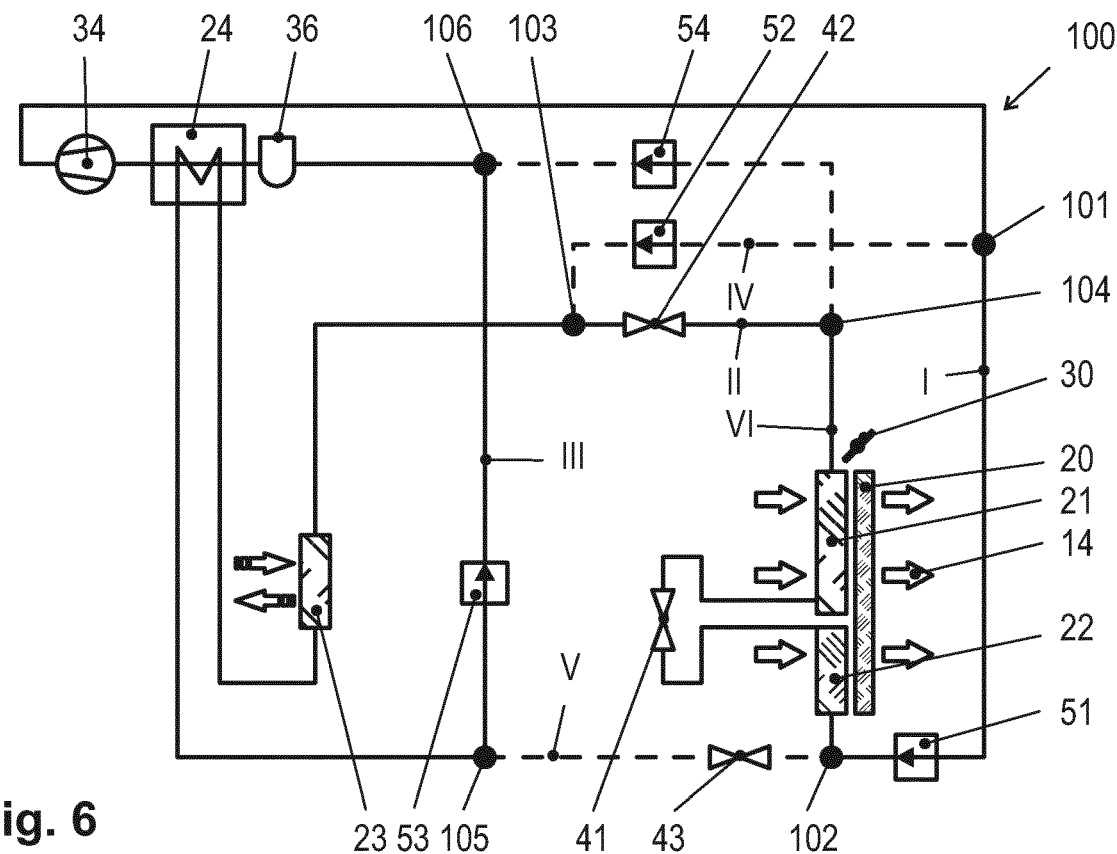
FIG. 6 shows the refrigerant circuit from FIG. 5 in heat pump mode.

FIG. 6 shows the refrigerant circuit 100 in heat pump mode. For this purpose, the first shutoff valve 51 is open and the second shutoff valve 52 is closed. Refrigerant that is compressed by the compressor 34 thus flows through the first refrigerant line section I, whereas there is no flow through the fourth refrigerant line section IV. As an alternative to the arrangement of the shutoff valves 51, 52 in the first and fourth refrigerant line sections I, IV, respectively, it would be possible to install a switchable two-way valve at the first branch point 101. In addition, in heat pump mode the third shutoff valve 53 is open and the fourth shutoff valve 54 is closed. Refrigerant may thus flow through the third refrigerant line section III, while the sixth refrigerant line section VI is blocked. As an alternative to the arrangement of the third and fourth shutoff valves 53, 54 in the third and sixth refrigerant line sections III, VI, respectively, a two-way valve could be used at the sixth opening point 106.

Furthermore, the heat pump mode is additionally characterized in that the fifth refrigerant line section V is likewise blocked. In the illustrated embodiment, the third expansion valve 43 is used for this purpose. Alternatively, an additional shutoff valve in the fifth refrigerant line section V could be used for this purpose.

The refrigerant compressed in the compressor 34 thus flows through the first refrigerant line section I into the second air/refrigerant heat exchanger segment 22. In this mode, the latter is operated as a condenser, and transfers heat from the refrigerant to the air stream 14. From the outlet of the second air/refrigerant heat exchanger segment 22, the refrigerant passes across the first expansion valve 41 to the first air/refrigerant heat exchanger segment 21. Depending on the position of the first expansion valve 41, the pressure drop may be adjusted in such a way that the first air/refrigerant heat exchanger segment 21 is likewise operated either as a condenser at essentially the same temperature level as the second air/refrigerant heat exchanger segment 22, as a condenser but at a lower temperature level than the second air/refrigerant heat exchanger segment 22, or as an evaporator that withdraws heat from the air stream 14 flowing through it. The adjustment of the first expansion valve 41 typically takes place within the scope of a regulation for achieving a desired temperature stratification in the downstream mixing chamber, not shown separately. In the illustrated embodiment, the air stream 14 downstream from the first and second air/refrigerant heat exchanger segments 21, 22 still flows through the electric heat exchanger segment 20, where auxiliary heating or counterheating may take place. With regard to the circuit design of the refrigerant circuit 100, however, the electric heat exchanger segment 20 may be regarded as optional.

Downstream from the first air/refrigerant heat exchanger segment 21, the refrigerant at the fourth branch point 104 flows into the second refrigerant line section II, since due to the blocked position of the fourth shutoff valve 54, the sixth refrigerant line section VI, which likewise diverges from the fourth branch point 104, is blocked. Further expansion of the refrigerant takes place in the second expansion valve 42, which is contained in the second refrigerant line section II; in any case, the pressure of the refrigerant should be low enough that the downstream coupling heat exchanger 23 is operated as an evaporator which absorbs heat from the adjoining refrigerant circuit.

Downstream from the coupling heat exchanger 23, the refrigerant flows through the high-pressure portion of the internal heat exchanger 24. It is recognized by those skilled in the art that the high-pressure portion of the internal heat exchanger as well as the collector 36 are strictly optional, and depend essentially on the refrigerant selected. Also conceivable is a direct connection of the outlet of the coupling heat exchanger 23 to the fifth opening point 105, to which the high-pressure outlet of the internal heat exchanger 24 is connected in the illustrated embodiment.

From here, the refrigerant flows through the open third shutoff valve 53 and the third refrigerant line section III, and passes through the sixth opening point 106, the low-pressure portion of the internal heat exchanger 24, and back to the compressor 34.

Figure 7:
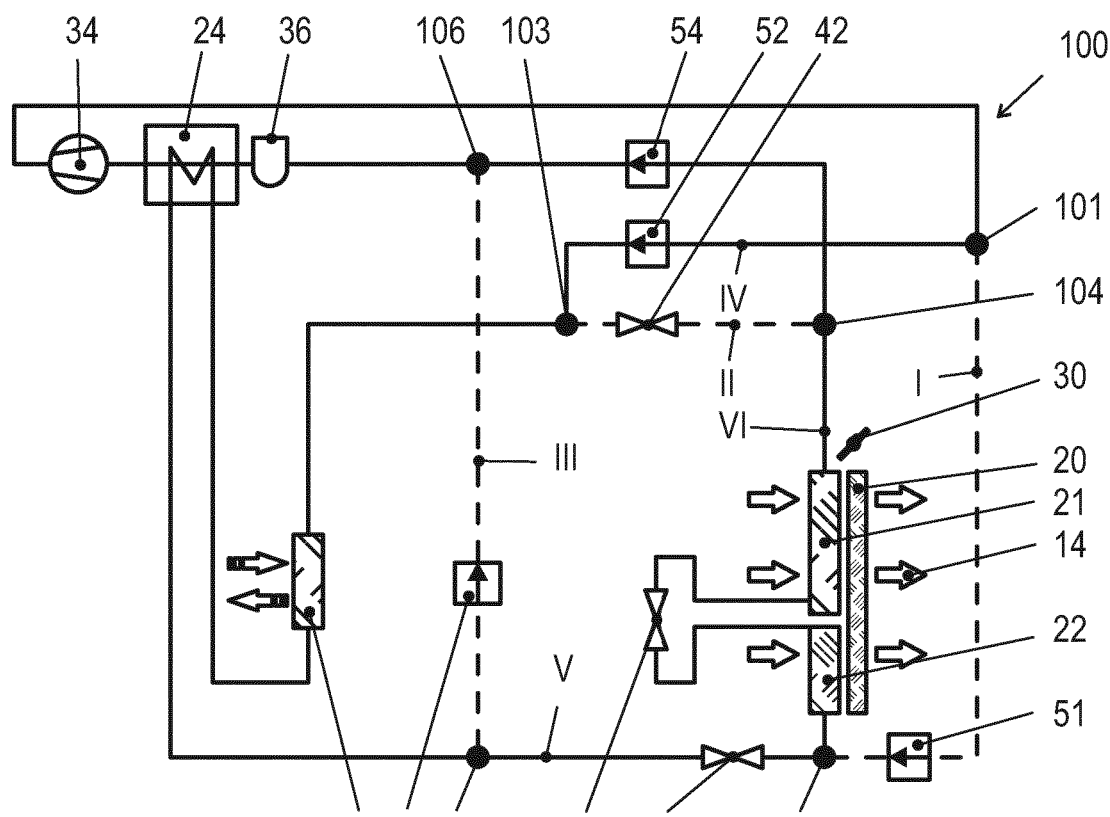
FIG. 7 shows the refrigerant circuit from FIG. 5 in cooling mode.

FIG. 7 shows the refrigerant circuit 100 in cooling mode. The first shutoff valve 51 is closed and the second shutoff valve 52 is open. In addition, the third shutoff valve 53 is closed and the fourth shutoff valve 54 is open. The third expansion valve 53 is in controlled operation in this mode. In contrast, the second expansion valve 52 is closed and blocks the second refrigerant line section II, for which reason in an alternative embodiment, an additional shutoff valve could be used in the second refrigerant line section II.

The refrigerant compressed by the compressor 34 branches off into the fourth refrigerant line section IV at the first branch point 101, and passes through the third opening point 103 to the inlet of the coupling heat exchanger 23, which in this mode is operated as a condenser and releases heat to the adjoining refrigerant circuit. After passing through the high-pressure portion of the optional internal heat exchanger 24, the refrigerant at the fifth branch point 105, due to the closed third shutoff valve 53, flows into the fifth refrigerant line section V, where it is expanded by means of the third expansion valve 43.

Since the first shutoff valve 51 is closed, the expanded refrigerant flows from the second opening point 102 into the second air/refrigerant heat exchanger segment 22. Depending on the adjustment of the third expansion valve 43, the second air/refrigerant heat exchanger segment 22 may be utilized as a further condenser in order to release heat to the portion of the air stream 14 flowing through it. However, the second air/refrigerant heat exchanger segment may also be operated as an evaporator, absorbing heat from the portion of the air stream 14 flowing through it. In practice, depending on the desired temperature stratification, the adjustment is made in the mixing chamber, not illustrated. On the refrigerant side downstream from the second air/refrigerant heat exchanger segment 22, the refrigerant undergoes further expansion in the first expansion valve 41 and subsequently flows through the first air/refrigerant heat exchanger segment 21, which in this mode in any case is operated as an evaporator in order to absorb heat from the portion of the air stream 14 flowing through it.

At the fourth branch point 104, situated on the refrigerant side downstream from the first air/refrigerant heat exchanger segment 21, due to the closed second expansion valve 42 the refrigerant flows into the sixth refrigerant line section and through the open fourth shutoff valve 54 to the collector 36, and through the low-pressure portion of the optional internal heat exchanger 24 back to the compressor 34.

Those skilled in the art will recognize that the three nonoptional heat exchangers or heat exchanger segments, namely, the first air/refrigerant heat exchanger segment 21, the second air/refrigerant heat exchanger segment 22, and the coupling heat exchanger 23, may each be operated as a condenser as well as an evaporator in the described refrigerant circuit 100. By suitable adjustment of a few switching and control elements, operation of the refrigerant circuit 100 in two fundamental modes is possible, namely, a heat pump mode and a cooling mode, wherein within each of the two modes, depending on the requirements, differentiated temperature stratification is possible in the mixing chamber on the air side downstream from the internal heat exchangers. In this way, the temperature distribution in the passenger compartment may be adjusted in a particularly flexible and individual manner.

Of course, the embodiments discussed in the detailed description and shown in the figures represent only illustrative exemplary embodiments of the present invention. In light of the present disclosure, those skilled in the art are provided with a broad spectrum of variation options.

LIST OF REFERENCE NUMERALS 10 housing
12 air guiding channel
12' side path of 12
14 air stream
16a air stream portion to the floorboard
16b air stream portion to the headroom
18 filter
20 electric heat exchanger segment
21 first air/refrigerant heat exchanger segment
22 second air/refrigerant heat exchanger segment
23 coupling heat exchanger
24 internal heat exchanger
30 bypass flap
32 actuator
34 compressor
36 collector
41 first expansion valve
42 second expansion valve
43 third expansion valve
51 first shutoff valve
52 second shutoff valve
53 third shutoff valve
54 fourth shutoff valve
100 refrigerant circuit
101 first branch/opening point
102 second branch/opening point
103 third branch/opening point
104 fourth branch/opening point
105 fifth branch/opening point
106 sixth branch/opening point
I first refrigerant line section
II second refrigerant line section
III third refrigerant line section
IV fourth refrigerant line section
V fifth refrigerant line section
VI sixth refrigerant line section

The invention claimed is:

1. An air conditioning device for a motor vehicle, having, situated in a housing, a refrigerant circuit comprising:
a compressor,
an internal heat exchanger arrangement which, on the inlet side, is connected to an outlet of the compressor via a first refrigerant line section, and through which portions of an air stream are conductible into a passenger compartment of the motor vehicle, including:
a first air/refrigerant heat exchanger segment that is operable as an evaporator of the refrigerant circuit,
a first expansion valve that is situated upstream from the first air/refrigerant heat exchanger segment in the flow direction of the refrigerant, and
a second air/refrigerant heat exchanger segment that is situated upstream from the first expansion valve in the flow direction of the refrigerant, and that is operable as a condenser of the refrigerant circuit,
a second expansion valve situated downstream from the internal heat exchanger arrangement in the flow direction of the refrigerant, and
a coupling heat exchanger that is connected on the input side to the second expansion valve via a second refrigerant line section, and thermally connected to a heat source or heat sink, and whose outlet is connected to the inlet of the compressor via a third refrigerant line section,
wherein:
the first refrigerant line section and the second refrigerant line section are connected to one another via a fourth refrigerant line section,
the inlet of the second air/refrigerant heat exchanger segment and the outlet of the coupling heat exchanger are connected to one another via a fifth refrigerant line section that contains a third expansion valve, and
the outlet of the first air/refrigerant heat exchanger segment and the inlet of the compressor are connected to one another via a sixth refrigerant line section,
wherein adjustable valves are distributed in the refrigerant circuit in such a way that, as a function of their switching position, such that, if in a heat pump mode, refrigerant may flow through the first, second, and third refrigerant line sections, while flow of refrigerant through the fourth, fifth, and sixth refrigerant line sections is prevented, and if in a cooling mode, refrigerant may flow through the fourth, fifth, and sixth refrigerant line sections, while flow of refrigerant through the first, second, and third refrigerant line sections is prevented.

2. The air conditioning device according to claim 1, wherein a switchable two-way valve is situated at the branch point from the first and fourth refrigerant line sections.

3. The air conditioning device according to claim 1, wherein a switchable shutoff valve is situated in each case downstream from the branch point of the first and fourth refrigerant line sections.

4. The air conditioning device according to claim 1, wherein a switchable two-way valve is situated at the opening point of the third and sixth refrigerant line sections.

5. The air conditioning device according to claim 1, wherein a switchable shutoff valve is situated in each case upstream from the opening point of the third and sixth refrigerant line sections.

6. The air conditioning device according to claim 1, wherein the low pressure outlet of an internal heat exchanger designed as a refrigerant/refrigerant heat exchanger, and whose low pressure inlet is situated downstream from the opening point of the third and sixth refrigerant line sections and whose high pressure inlet and outlet are situated between the outlet of the coupling heat exchanger and the branch point of the third and fifth refrigerant line sections, is situated upstream from the compressor.

7. The air conditioning device according to claim 1, wherein the coupling heat exchanger is designed as a refrigerant/refrigerant heat exchanger which on the refrigerant side is thermally connected to a drive unit and/or its electrical components.

8. A method for operating an air conditioning device according to claim 1, comprising:
switching the adjustable valves in the switching position of the heat pump mode,
controlling the first expansion valve for setting a temperature difference between the second air/refrigerant heat exchanger segment, operated as a condenser, and the first air/refrigerant heat exchanger segment, operated as a condenser or as an evaporator, and
controlling the second expansion valve for setting a pressure difference between the first air/refrigerant heat exchanger segment and the coupling heat exchanger, operated as an evaporator.

9. The method for operating an air conditioning device according to claim 8, further comprising:
- switching the adjustable valves in the switching position of the cooling mode,
- controlling the third expansion valve for setting a pressure difference between the coupling heat exchanger, operated as a condenser, and the second air/refrigerant heat exchanger segment, operated as an evaporator or as a condenser, and
- controlling the first expansion valve for setting a temperature difference between the second air/refrigerant heat exchanger segment and the first air/refrigerant heat exchanger segment, operated as an evaporator.

* * * * *